US012562070B2

(12) United States Patent
Child

(10) Patent No.: US 12,562,070 B2
(45) Date of Patent: Feb. 24, 2026

(54) SYSTEMS AND METHODS FOR TRACKING AIRCRAFT

(71) Applicant: Leonardo US Cyber and Security Solutions, LLC, Greensboro, NC (US)

(72) Inventor: Todd Child, Greensboro, NC (US)

(73) Assignee: Leonardo US Cyber and Security Solutions, LLC, Greensboro, NC (US)

( * ) Notice: Subject to any disclaimer, the term of this patent is extended or adjusted under 35 U.S.C. 154(b) by 503 days.

(21) Appl. No.: 17/988,153

(22) Filed: Nov. 16, 2022

(65) Prior Publication Data

US 2024/0021092 A1    Jan. 18, 2024

Related U.S. Application Data

(60) Provisional application No. 63/280,851, filed on Nov. 18, 2021.

(51) Int. Cl.
*G08G 5/72* (2025.01)
*G06F 18/24* (2023.01)
*G08G 5/26* (2025.01)

(52) U.S. Cl.
CPC ............... *G08G 5/723* (2025.01); *G08G 5/26* (2025.01); *G06F 18/24* (2023.01)

(58) Field of Classification Search
CPC .......... G08G 5/723; G08G 5/26; G06F 18/24; H04W 4/40; H04W 4/029; H04W 12/79
See application file for complete search history.

(56) References Cited

U.S. PATENT DOCUMENTS

| | | | |
|---|---|---|---|
| 3,656,111 | A | 4/1972 | Royster, Sr. |
| 4,843,463 | A | 6/1989 | Michetti |
| 6,140,941 | A | 10/2000 | Dwyer et al. |
| 6,340,935 | B1 | 1/2002 | Hall |
| 6,538,580 | B2 | 3/2003 | Bostrom |
| 6,650,765 | B1 | 11/2003 | Alves |
| 6,754,368 | B1 | 6/2004 | Cohen |
| 6,844,841 | B1 | 1/2005 | Masciulli |
| 6,922,138 | B2 | 7/2005 | Melvin |
| 6,959,869 | B2 | 11/2005 | Tsikos et al. |
| 6,975,178 | B1 * | 12/2005 | Kessler ..................... H01P 1/12 |
| | | | 333/262 |

(Continued)

FOREIGN PATENT DOCUMENTS

| | | |
|---|---|---|
| AU | 2013201309 B2 | 8/2014 |
| CA | 2620630 C | 9/2014 |

(Continued)

OTHER PUBLICATIONS

Howington, Larry C.; Automated License Plate Reading; Development and use of Perceptics multi-purpose License Plate Reader Technology; Sep. 1989.

(Continued)

*Primary Examiner* — Sohana Tanju Khayer
(74) *Attorney, Agent, or Firm* — Adams & Reese LLP; D. Scott Sudderth

(57) ABSTRACT
A system and method to monitor for one or more different signals from and/or associated with an aircraft. In an embodiment, the system may include a concealable package, one or more signal receivers in the concealable package to scan for signals, and one or more signal processors to monitor, classify, store, and transmit any detected signals.

28 Claims, 4 Drawing Sheets

(56) References Cited

U.S. PATENT DOCUMENTS

| | | | | |
|---|---|---|---|---|
| 6,982,654 | B2 | 1/2006 | Rau et al. | |
| 7,046,169 | B2 | 5/2006 | Bucholz et al. | |
| 7,173,526 | B1 | 2/2007 | Monroe | |
| 7,227,974 | B2 | 6/2007 | Kamijo et al. | |
| 7,342,511 | B2 | 3/2008 | Schuette | |
| 7,344,284 | B2 | 3/2008 | Lynam et al. | |
| 7,382,280 | B2 | 6/2008 | Long | |
| 7,460,028 | B2 | 12/2008 | Garibotto et al. | |
| 7,465,108 | B2 | 12/2008 | Brown | |
| 7,482,910 | B2 | 1/2009 | Melvin | |
| 7,504,965 | B1 | 3/2009 | Windover et al. | |
| 7,535,793 | B2 | 5/2009 | Frantz | |
| 7,825,829 | B2 | 11/2010 | Madsen | |
| 7,868,912 | B2 | 1/2011 | Venetianer | |
| 7,889,931 | B2 | 2/2011 | Webb et al. | |
| 7,920,626 | B2 | 4/2011 | Fernandez | |
| 8,068,154 | B2 | 11/2011 | Jacob et al. | |
| 8,117,090 | B2 | 2/2012 | Romero | |
| 8,243,140 | B1 | 8/2012 | Howe | |
| 8,408,772 | B2 | 4/2013 | Li | |
| 8,447,112 | B2 | 5/2013 | Paul et al. | |
| 8,666,801 | B2 | 3/2014 | Cho | |
| 8,693,733 | B1 | 4/2014 | Harrison | |
| 8,704,889 | B2 | 4/2014 | Hofman | |
| 8,774,465 | B2 | 7/2014 | Christopulos et al. | |
| 8,781,169 | B2 | 7/2014 | Jackson et al. | |
| 8,817,098 | B2 | 8/2014 | Millar | |
| 8,953,044 | B2 | 2/2015 | Wu et al. | |
| 8,983,137 | B2 | 3/2015 | Hradetzky | |
| 9,058,619 | B2 | 6/2015 | Nandakumar et al. | |
| 9,141,503 | B1 | 9/2015 | Chen | |
| 9,158,954 | B2 | 10/2015 | Thuries et al. | |
| 9,171,382 | B2 | 10/2015 | Nerayoff et al. | |
| 9,245,203 | B2 | 1/2016 | Hofman et al. | |
| 9,280,895 | B2 | 3/2016 | Wang et al. | |
| 9,327,685 | B1 | 5/2016 | Wooten | |
| 9,342,934 | B2 | 5/2016 | Chen | |
| 9,426,345 | B1 | 8/2016 | Turner, Jr. et al. | |
| 9,436,880 | B2 | 9/2016 | Bos et al. | |
| 9,471,838 | B2 | 10/2016 | Miller et al. | |
| 9,477,917 | B1 | 10/2016 | Koch | |
| 9,491,420 | B2 | 11/2016 | Mimar | |
| 9,495,869 | B2 | 11/2016 | Bhogal et al. | |
| 9,497,393 | B2 | 11/2016 | Reed et al. | |
| 9,538,060 | B1 | 1/2017 | Cilia | |
| 9,542,609 | B2 | 1/2017 | Wu et al. | |
| 9,594,158 | B2 | 3/2017 | Abl | |
| 9,607,510 | B1 | 3/2017 | DeLorean | |
| 9,652,666 | B2 | 5/2017 | Nerayoff et al. | |
| 9,685,084 | B2 | 6/2017 | Scholl et al. | |
| 9,715,703 | B2 | 7/2017 | Robinson et al. | |
| 9,779,309 | B1 | 10/2017 | Fink et al. | |
| 9,796,331 | B2 | 10/2017 | Karner et al. | |
| 9,818,157 | B2 | 11/2017 | McCall et al. | |
| 9,846,883 | B2 | 12/2017 | Angell et al. | |
| 9,858,493 | B2 | 1/2018 | Tseng | |
| 9,911,297 | B2 | 3/2018 | Lundy | |
| 9,972,230 | B1 | 5/2018 | DeLorean | |
| 9,990,376 | B2 | 6/2018 | Voeller et al. | |
| 9,996,861 | B2 | 6/2018 | Ryan et al. | |
| 10,027,361 | B2 | 7/2018 | Griffin | |
| 10,032,212 | B2 | 7/2018 | Winkelman et al. | |
| 10,055,906 | B1 | 8/2018 | Fournier et al. | |
| 10,057,713 | B1 | 8/2018 | Rackley, III et al. | |
| 10,089,869 | B1 | 10/2018 | Makled et al. | |
| 10,121,172 | B2 | 11/2018 | Hudson | |
| 10,127,437 | B2 | 11/2018 | Bhanu et al. | |
| 10,140,488 | B1 | 11/2018 | Bondarenko et al. | |
| 10,152,858 | B2 | 12/2018 | Boykin | |
| 10,164,974 | B2 | 12/2018 | Spencer et al. | |
| 10,198,954 | B2 | 2/2019 | Holtzman et al. | |
| 10,217,034 | B2 | 2/2019 | Hoshino | |
| 10,223,609 | B2 | 3/2019 | Bhanu et al. | |
| 10,373,226 | B1 | 8/2019 | Russell | |
| 10,417,816 | B2 | 9/2019 | Satzoda et al. | |
| 10,559,200 | B1 | 2/2020 | Langley et al. | |
| 10,691,968 | B2 | 6/2020 | Blais-Morin et al. | |
| 10,872,524 | B2 | 12/2020 | Kienitz et al. | |
| 11,022,672 | B1* | 6/2021 | Chartier | G01S 5/02216 |
| 11,030,892 | B1 | 6/2021 | Langley et al. | |
| 11,080,533 | B2 | 8/2021 | Camilus et al. | |
| 11,243,959 | B1 | 2/2022 | Gilboa | |
| 11,941,716 | B2 | 3/2024 | Child et al. | |
| 12,143,137 | B1* | 11/2024 | Avvanzo | H04L 67/12 |
| 2002/0089157 | A1 | 7/2002 | Breed et al. | |
| 2002/0186148 | A1 | 12/2002 | Trajkovic et al. | |
| 2003/0131011 | A1 | 7/2003 | Haunschild et al. | |
| 2004/0218052 | A1 | 11/2004 | DiDomenico et al. | |
| 2005/0012817 | A1 | 1/2005 | Hampapur | |
| 2005/0065711 | A1 | 3/2005 | Dahlgren et al. | |
| 2006/0007308 | A1 | 1/2006 | Ide | |
| 2006/0028556 | A1 | 2/2006 | Bunn et al. | |
| 2006/0030985 | A1 | 2/2006 | Lawida et al. | |
| 2006/0106659 | A1 | 5/2006 | Santos et al. | |
| 2006/0109083 | A1 | 5/2006 | Rathus et al. | |
| 2006/0180647 | A1 | 8/2006 | Hansen | |
| 2006/0269105 | A1 | 11/2006 | Langlinais | |
| 2006/0278705 | A1 | 12/2006 | Hedley et al. | |
| 2007/0008129 | A1 | 1/2007 | Soliman | |
| 2007/0009136 | A1 | 1/2007 | Pawlenko et al. | |
| 2007/0069921 | A1 | 3/2007 | Sefton | |
| 2007/0112620 | A1 | 5/2007 | Johnson | |
| 2007/0229307 | A1 | 10/2007 | Pawlenko et al. | |
| 2007/0291118 | A1 | 12/2007 | Shu et al. | |
| 2008/0045245 | A1 | 2/2008 | Billmaier et al. | |
| 2008/0117296 | A1 | 5/2008 | Egnal et al. | |
| 2008/0150792 | A1* | 6/2008 | Stayton | H04B 17/327 342/173 |
| 2008/0285803 | A1 | 11/2008 | Madsen | |
| 2009/0088924 | A1 | 4/2009 | Coffee et al. | |
| 2009/0161913 | A1 | 6/2009 | Son | |
| 2010/0066537 | A1 | 3/2010 | Weller et al. | |
| 2010/0088123 | A1 | 4/2010 | McCall et al. | |
| 2010/0195871 | A1 | 8/2010 | Simon | |
| 2010/0245582 | A1 | 9/2010 | Harel | |
| 2010/0283662 | A1 | 11/2010 | Fox | |
| 2011/0053559 | A1 | 3/2011 | Klein | |
| 2011/0134240 | A1 | 6/2011 | Anderson et al. | |
| 2011/0228085 | A1 | 9/2011 | Hofman | |
| 2011/0228253 | A1 | 9/2011 | Batten et al. | |
| 2011/0267222 | A1* | 11/2011 | Craig | G01S 3/04 342/28 |
| 2011/0313644 | A1 | 12/2011 | Grassi | |
| 2012/0106801 | A1 | 5/2012 | Jackson | |
| 2012/0140079 | A1 | 6/2012 | Millar | |
| 2012/0155712 | A1 | 6/2012 | Paul et al. | |
| 2013/0082828 | A1 | 4/2013 | Furey et al. | |
| 2013/0093886 | A1 | 4/2013 | Rothschild | |
| 2013/0129152 | A1 | 5/2013 | Rodriguez Serrano et al. | |
| 2013/0132166 | A1 | 5/2013 | Wu et al. | |
| 2013/0135468 | A1 | 5/2013 | Kim | |
| 2013/0282448 | A1 | 10/2013 | Rydbeck et al. | |
| 2013/0303189 | A1 | 11/2013 | Bennett | |
| 2013/0306728 | A1 | 11/2013 | Thuries et al. | |
| 2013/0308003 | A1 | 11/2013 | Raghavan | |
| 2013/0325629 | A1 | 12/2013 | Harrison | |
| 2014/0046800 | A1 | 2/2014 | Chen | |
| 2014/0066089 | A1 | 3/2014 | Monks | |
| 2014/0093125 | A1 | 4/2014 | Hradetzky | |
| 2014/0126779 | A1 | 5/2014 | Duda | |
| 2014/0139660 | A1 | 5/2014 | Zhu | |
| 2014/0159925 | A1 | 6/2014 | Mimeault et al. | |
| 2014/0160283 | A1 | 6/2014 | Hofman et al. | |
| 2014/0225719 | A1 | 8/2014 | Kesavan et al. | |
| 2014/0241585 | A1 | 8/2014 | Zafiroglu et al. | |
| 2014/0254866 | A1 | 9/2014 | Jankowski et al. | |
| 2014/0254877 | A1 | 9/2014 | Jankowski et al. | |
| 2014/0254878 | A1 | 9/2014 | Jankowski et al. | |
| 2014/0334684 | A1 | 11/2014 | Strimling | |
| 2015/0049914 | A1 | 2/2015 | Alves | |
| 2015/0054676 | A1 | 2/2015 | Vinski et al. | |
| 2015/0113012 | A1 | 4/2015 | Silver | |
| 2015/0119069 | A1 | 4/2015 | Harris et al. | |
| 2015/0123794 | A1 | 5/2015 | Hamalainen et al. | |

(56) References Cited

U.S. PATENT DOCUMENTS

| | | |
|---|---|---|
| 2015/0138001 A1 | 5/2015 | Davies |
| 2015/0149465 A1 | 5/2015 | Unser et al. |
| 2015/0154669 A1 | 6/2015 | Wu et al. |
| 2015/0205868 A1 | 7/2015 | Boncyk et al. |
| 2015/0294373 A1 | 10/2015 | Schuh |
| 2015/0310293 A1 | 10/2015 | Dehart |
| 2015/0317687 A1 | 11/2015 | Ramesh et al. |
| 2015/0348342 A1 | 12/2015 | Baxley et al. |
| 2015/0350914 A1* | 12/2015 | Baxley ................. H04W 72/20 |
| | | 726/11 |
| 2015/0356498 A1 | 12/2015 | Casanova |
| 2015/0381946 A1 | 12/2015 | Renkis |
| 2015/0381948 A1 | 12/2015 | Renkis |
| 2016/0021344 A1 | 1/2016 | Renkis |
| 2016/0098864 A1 | 4/2016 | Nawrocki |
| 2016/0110759 A1 | 4/2016 | Polehn et al. |
| 2016/0112461 A1 | 4/2016 | Othmer |
| 2016/0124071 A1* | 5/2016 | Baxley ................... H04W 4/70 |
| | | 348/143 |
| 2016/0266579 A1 | 9/2016 | Chen |
| 2016/0343252 A1 | 11/2016 | Davies et al. |
| 2016/0344979 A1 | 11/2016 | Renkis |
| 2017/0018170 A1 | 1/2017 | Sayavong et al. |
| 2017/0032666 A1 | 2/2017 | Pretorius et al. |
| 2017/0048376 A1 | 2/2017 | Logan |
| 2017/0061506 A1 | 3/2017 | Dow et al. |
| 2017/0124395 A1 | 5/2017 | Cohen et al. |
| 2017/0126648 A1 | 5/2017 | Bond et al. |
| 2017/0131202 A1 | 5/2017 | McClintock et al. |
| 2017/0140237 A1 | 5/2017 | Voeller et al. |
| 2017/0186317 A1 | 6/2017 | Franklin et al. |
| 2017/0193810 A1 | 7/2017 | Cao et al. |
| 2017/0206559 A1 | 7/2017 | Bakshi et al. |
| 2017/0308964 A1 | 10/2017 | Morris et al. |
| 2017/0330455 A1 | 11/2017 | Kikuchi et al. |
| 2017/0339529 A1 | 11/2017 | Buttolo et al. |
| 2017/0357662 A1 | 12/2017 | Knany et al. |
| 2017/0357881 A1 | 12/2017 | Hoshino |
| 2017/0365105 A1 | 12/2017 | Rao et al. |
| 2017/0372143 A1 | 12/2017 | Barcus et al. |
| 2017/0374324 A1 | 12/2017 | Loftus |
| 2018/0032590 A1 | 2/2018 | Recavarren |
| 2018/0072177 A1 | 3/2018 | Tremblay |
| 2018/0096595 A1 | 4/2018 | Janzen et al. |
| 2018/0103348 A1 | 4/2018 | Malone |
| 2018/0107528 A1 | 4/2018 | Vizer et al. |
| 2018/0107892 A1 | 4/2018 | Istenes |
| 2018/0137356 A1 | 5/2018 | Nerayoff et al. |
| 2018/0144382 A1 | 5/2018 | Makke et al. |
| 2018/0165935 A1 | 6/2018 | VanBlon et al. |
| 2018/0174457 A1 | 6/2018 | Taylor |
| 2018/0180709 A1* | 6/2018 | Eaves ....................... G01S 5/06 |
| 2018/0192374 A1* | 7/2018 | Jain ................... H04W 52/0254 |
| 2018/0197416 A1 | 7/2018 | Hyde et al. |
| 2018/0211115 A1 | 7/2018 | Klein |
| 2018/0211116 A1 | 7/2018 | Modi et al. |
| 2018/0211117 A1 | 7/2018 | Ratti |
| 2018/0247519 A1 | 8/2018 | Bekanich |
| 2018/0253805 A1 | 9/2018 | Kelly et al. |
| 2018/0300578 A1 | 10/2018 | Wilbert et al. |
| 2018/0328757 A1 | 11/2018 | Chan et al. |
| 2018/0349699 A1 | 12/2018 | O'Connell et al. |
| 2018/0350230 A1 | 12/2018 | Kienitz et al. |
| 2018/0357247 A1 | 12/2018 | Siminoff et al. |
| 2019/0031146 A1 | 1/2019 | Etonye |
| 2019/0039463 A1 | 2/2019 | Moghe et al. |
| 2019/0043355 A1 | 2/2019 | Ferguson et al. |
| 2019/0050634 A1 | 2/2019 | Nerayoff et al. |
| 2019/0050652 A1 | 2/2019 | Baker et al. |
| 2019/0051142 A1 | 2/2019 | Wiles |
| 2019/0057601 A1 | 2/2019 | Watanabe et al. |
| 2019/0087864 A1 | 3/2019 | Hacker |
| 2019/0147260 A1 | 5/2019 | May |
| 2019/0147306 A1 | 5/2019 | Hoshino |
| 2019/0163982 A1 | 5/2019 | Block |

| | | |
|---|---|---|
| 2019/0244498 A1 | 8/2019 | Dumas |
| 2019/0294890 A1 | 9/2019 | Kanga |
| 2019/0311327 A1 | 10/2019 | Habbaba et al. |
| 2019/0325230 A1 | 10/2019 | Nadler |
| 2019/0329421 A1 | 10/2019 | Deyle et al. |
| 2020/0097735 A1 | 3/2020 | Altuev |
| 2020/0104566 A1 | 4/2020 | Yamada et al. |
| 2020/0111350 A1 | 4/2020 | Julian et al. |
| 2020/0162701 A1 | 5/2020 | Nixon et al. |
| 2020/0211345 A1 | 7/2020 | Gordon-Carroll et al. |
| 2020/0265258 A1 | 8/2020 | Blais-Morin et al. |
| 2021/0026019 A1 | 1/2021 | Gahagan et al. |
| 2021/0044959 A1 | 2/2021 | Beaurepaire |
| 2021/0225161 A1 | 7/2021 | Horn |
| 2021/0326563 A1 | 10/2021 | Kossor |
| 2021/0398298 A1 | 12/2021 | Kisara |
| 2022/0003744 A1* | 1/2022 | Kameoka ............. G01N 27/223 |
| 2022/0113392 A1* | 4/2022 | Amsalem ................ G01S 1/753 |
| 2022/0141426 A1 | 5/2022 | Kim et al. |
| 2022/0148320 A1 | 5/2022 | Alakarhu |
| 2022/0188953 A1 | 6/2022 | Child et al. |
| 2022/0278538 A1* | 9/2022 | Kainzmaier ........... B64U 50/37 |
| 2022/0294946 A1 | 9/2022 | D'Annunzio |
| 2023/0010292 A1 | 1/2023 | Simon |
| 2023/0046309 A1 | 2/2023 | May |
| 2023/0070108 A1 | 3/2023 | Child |
| 2023/0073717 A1 | 3/2023 | Child |
| 2023/0073876 A1 | 3/2023 | Child |
| 2023/0162310 A1 | 5/2023 | Child et al. |
| 2023/0177954 A1 | 6/2023 | Neff et al. |
| 2023/0196780 A1 | 6/2023 | Nieuwkerk et al. |
| 2023/0237907 A1 | 7/2023 | Valcarcel et al. |
| 2023/0274647 A1 | 8/2023 | Nieuwkerk et al. |
| 2024/0185371 A1 | 6/2024 | Child et al. |

FOREIGN PATENT DOCUMENTS

| | | | |
|---|---|---|---|
| CA | 2916418 | A1 | 6/2017 |
| CA | 3000127 | A1 | 6/2018 |
| CA | 2924997 | C | 6/2021 |
| CA | 2979406 | C | 2/2024 |
| CN | 102708693 | A | 10/2012 |
| CN | 203050715 | U | 7/2013 |
| DE | 102005035242 | A1 | 2/2007 |
| EP | 0784838 | B1 | 6/2000 |
| EP | 1993279 | A2 | 11/2008 |
| EP | 3726253 | A1 | 10/2020 |
| EP | 3989194 | A1 | 4/2022 |
| FR | 2975210 | A3 | 11/2012 |
| GB | 2328731 | A | 3/1999 |
| IN | 282920 | B | 5/2017 |
| SG | 140858 | A1 | 4/2008 |
| TW | 201935419 | A | 9/2019 |
| WO | WO2004/027730 | A1 | 4/2004 |
| WO | WO2007/032025 | A2 | 3/2007 |
| WO | WO2008/088880 | A1 | 7/2008 |
| WO | WO2011/023024 | A1 | 3/2011 |
| WO | WO2012/038964 | A2 | 3/2012 |
| WO | WO2014/152923 | A1 | 9/2014 |
| WO | WO2015/193903 | A2 | 12/2015 |
| WO | WO2017/180900 | A1 | 10/2017 |
| WO | WO2018/009567 | A1 | 1/2018 |
| WO | WO2019/043444 | A1 | 3/2019 |
| WO | WO2019/043446 | A1 | 3/2019 |
| WO | WO2019/099149 | A1 | 5/2019 |
| WO | WO2019/162970 | A1 | 8/2019 |
| WO | WO2020/145882 | A1 | 7/2020 |

OTHER PUBLICATIONS

Waters, Rebecca; Automated License Plate Recognition: An Insider's Look; P&SN Police and Security News 2022; Posted by Publisher—Sep. 15, 2017.

Ceng, M. Smalley et al.; Videqual—A tool for quantitive meansurement of fixed CCTV Surveillance Systems; Presented and Published at the International Carnahan Conference on Security Technology 1996; 0-7803-3537-6-9/06; 1996 IEEE.

(56)                    References Cited

OTHER PUBLICATIONS

Kanayama, Kenji et al.; Development of Vehicle-License Number Recognition System Using Real-Time Image Processing and Its Application to Travel-Time Measurement; CH2944-7/91/0000/0798; 1991 IEEE.

Kwasnicka, Halina and Wawrzyniak, Bartosz; License Plate Localization and Recognition in Camera Pictures; AI-METH 2002—Artificial Intelligence Methods; Gliwice, Poland, Nov. 13-15, 2002.

Appian Technology PLC; Talon—Description and Technical Specification—Automatic Number Plate Recognition System; Copyright 2003.

Hoffman, Alwyn Jakobus and Albertus J. Pretorius: "SmartRoad; A new approach to law enforcement in dense traffic environments"; 2015 IEEE 18th International Conference on Intelligent Transportation Systems. IEEE, 2015; Year 2015.

Panganiban, Edward B. et al.; "RFID-Based Vehicle Monitoring System"; 2017 IEEE 9th International Conference on Humanoid, Nanotechnology, Information Technology, Communication and Control, Environmental Management (HNICEM); IEEE, Dec. 1-3, 2017; pp. 1-6; Year 2017.

Makarov, A., et al.; Authenticating Vehicles and Drivers in Motion Based on Computer Vision and RFID Tags; 2012 IEEE 10th Jubilee International Symposium on Intelligent Systems and Informatics; IEEE 2012; Year 2012.

Valera, M. and Velastin, S.A., "Intelligent distributed surveillance systems: a review", Source: vol. 152, Issue 2, Apr. 2005, p. 192-204, DOI: 10. 1049/ip-vis:20041147, Print ISSN 1350-245X, Online ISSN 1359-7108; 13 pages; 2005.

Hampapur, A.; "smart video surveillance: exploring the concept of multiscale spatiotemporal tracking", Published in: IEEE Signal Processing Magazine (vol. 22, Issue: 2, Mar. 2005), pp. 38-51; 2005.

Girgensohn, Andreas, "Dots: Support for Effective Video Surveillance", MM '07: Proceedings of the 15th ACM International conference on Multimedia Sep. 2007; pp. 423-432; 2007.

Hu, Weiming, et al.; "A Survey on Visual Surveillance of Object Motion and Behaviors"; IEEE Transactions on Systems, Man, and Cybernetics, Part C: Applications and Reviews, vol. 34, No. 3, Aug. 2004; pp. 334-352; Year 2004.

Foresti, Gian Luca et al. "Visual Sensor Technology for Advanced Surveillance Systems: Historical View, Technological Aspects and Research Activities in Italy", Department of Mathematics and Computer Science University of Udine, via delle Scienze, 206, 33100 Udine, Italy, Sensors ISSN 1424-8220; 19 Pages (2252-2270); Year 2009.

Notification of Transmittal and the International Search Report and Written Opinion of the International Searching Authority for PCT/US22/50064 dated Feb. 28, 2023.

Yaacoub, et al.; Security analysis of drones systems: Attacks, limitations, and recommendations; Internet of Things 11 (2020) 100218; Elsevier; www.elsevier.com/locate/iot; Retrieved on Apr. 17, 2023 (Apr. 17, 2023) from https://www.ncbi.nlm.nih.gov/pmc/articles/PMC7206421/.

* cited by examiner

Figure 3:
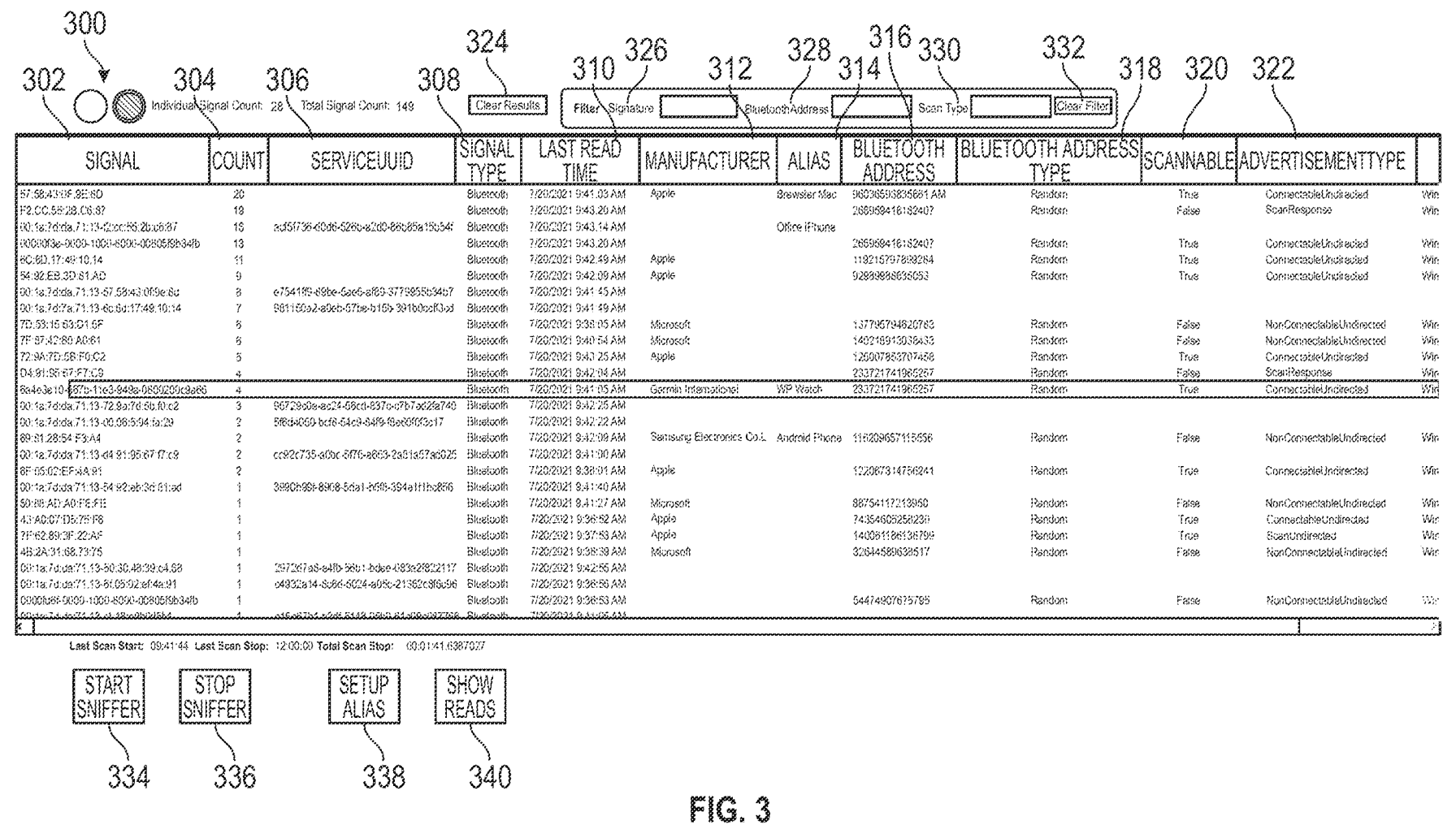

| SIGNAL | COUNT | SERVICE UUID | SIGNAL TYPE | LAST READ TIME | MANUFACTURER | ALIAS | BLUETOOTH ADDRESS | BLUETOOTH ADDRESS TYPE | SCANNABLE | ADVERTISEMENT TYPE | |
|---|---|---|---|---|---|---|---|---|---|---|---|
| 57:58:A7:15:9E:80 | 20 | | Bluetooth | 7/20/2021 9:41:05 AM | Apple | Browser/Mac | 9603805303505661AM | Random | True | ConnectableUndirected | Win |
| F2:CC:55:28:C6:87 | 18 | | Bluetooth | 7/20/2021 9:43:20 AM | | | 2065939416:182407 | Random | False | ScanResponse | Win |
| R0:1a:7d:da:71:13:42:cc:65:2b:c6:97 | 16 | a:d5f736:409b:50fb:9f80:86b8f8a135:34f | Bluetooth | 7/20/2021 9:43:14 AM | | Office iPhone | | | | | Win |
| 9C:60:17:49:10:14 | 13 | | Bluetooth | 7/20/2021 9:43:20 AM | | | 2065939416:182407 | Random | True | ConnectableUndirected | Win |
| 5A:92:EB:3D:81:AD | 11 | | Bluetooth | 7/20/2021 9:42:49 AM | Apple | | 11321579173:28284 | Random | True | ConnectableUndirected | Win |
| | 9 | e:754:1f5f:489e:5ae6:a8f9:3779355:5457 | Bluetooth | 7/20/2021 9:42:09 AM | Apple | | 9289898696363053 | Random | True | ConnectableUndirected | Win |
| 00:1a:7d:da:71:13:67:59:e3:0f59e:f6d | 8 | B911:50:a2:a9ch:577e:b1f5:39:10b0bcf0:a5 | Bluetooth | 7/20/2021 9:41:45 AM | | | | | | | |
| 7B:53:15:63:C1:5F | 6 | | Bluetooth | 7/20/2021 9:39:05 AM | Microsoft | | 13778670446267:83 | Random | False | NonConnectableUndirected | Win |
| 7F:97:A2:89:A0:61 | 6 | | Bluetooth | 7/20/2021 9:40:54 AM | Microsoft | | 1493749913036a33 | Random | False | NonConnectableUndirected | Win |
| 72:9A:7D:58:F0:C2 | 5 | | Bluetooth | 7/20/2021 9:43:25 AM | Apple | | 12500786370748 | Random | True | ConnectableUndirected | Win |
| D4:91:9F:F7:F7:C9 | 4 | | Bluetooth | 7/20/2021 9:42:04 AM | | | 2337274196:5267 | Random | False | ScanResponse | Win |
| 8a:4c3e:10:b7b:f1e3:848a:08062850d8d6 | 4 | 90739b0e:ac24:45bd:8370:c:f7b7:9x26a740 | Bluetooth | 7/20/2021 9:41:05 AM | Garmin International | WP Watch | 23172174196:5267 | Random | True | ConnectableUndirected | Win |
| 00:1a:7d:da:71:13:72:9a:7d:50:f0:e2 | 3 | 5f636:4069:bcf6:64c9:8af9:6b:e66f03:a1f | Bluetooth | 7/20/2021 9:42:22 AM | | | | | | | |
| 69:81:28:54:F3:A4 | 2 | | Bluetooth | 7/20/2021 9:42:09 AM | | | | | | | |
| 00:1a:7d:da:71:13:44:91:96:67:f7:c9 | 2 | cc92c735:409c:5ffb:a853:2a91a57ac025 | Bluetooth | 7/20/2021 9:41:00 AM | Samsung Electronics Co.L | Android Phone | 1182036571135656 | Random | False | NonConnectableUndirected | Win |
| 6F:05:02:EF:8A:91 | 2 | | Bluetooth | 7/20/2021 9:38:01 AM | Apple | | 122867314736241 | Random | True | ConnectableUndirected | Win |
| 00:1a:7d:da:71:13:54:92:eb:3d:81:ad | 2 | 3390cf69:89f8:5cb1:b49f:3944f11b:a876 | Bluetooth | 7/20/2021 9:41:40 AM | | | | | | | |
| 50:9B:AD:A0:FE:FE | 1 | | Bluetooth | 7/20/2021 9:41:07 AM | Microsoft | | 987541172113960 | Random | False | NonConnectableUndirected | Win |
| 43:A0:07:D5:75:F6 | 1 | | Bluetooth | 7/20/2021 9:36:52 AM | Apple | | 7435460525623:i | Random | True | ConnectableUndirected | Win |
| 7F:f62:8B:3F:22:AF | 1 | | Bluetooth | 7/20/2021 9:37:53 AM | Apple | | 14006118613:6799 | Random | True | ScanUndirected | Win |
| 4B:2A:31:68:73:75 | 1 | | Bluetooth | 7/20/2021 9:36:39 AM | Microsoft | | 32544589639517 | Random | False | NonConnectableUndirected | Win |
| 00:1a:7d:da:71:13:50:3b:48:39:c4:58 | 1 | 2372f7a5:e489:9de1:bd9e:4385e282:2117 | Bluetooth | 7/20/2021 9:42:05 AM | | | | | | | |
| 00:1a:7d:da:71:13:61:05:92:ef:4a:91 | 1 | 0493:2a14:8264:8824:a49fe:2138fc3f6a596 | Bluetooth | 7/20/2021 9:36:55 AM | | | 54474907615795 | Random | False | NonConnectableUndirected | Win |

Individual Signal Count: 28   Total Signal Count: 149

Last Scan Start: 09:41:44   Last Scan Stop: 12:00:00   Total Scan Stop: 00:01:41:6387037

300 302 304 306 308 324 310 326 312 328 314 316 330 318 320 322 332

Filter Signature   Bluetooth Address   Scan Type   Clear Filter   Clear Results

[START SNIFFER] [STOP SNIFFER] [SETUP ALIAS] [SHOW READS]

SYSTEMS AND METHODS FOR TRACKING AIRCRAFT

CROSS REFERENCE TO RELATED APPLICATIONS

The present Patent Application claims the benefit of U.S. Provisional Application No. 63/280,851, filed Nov. 18, 2021, titled "SYSTEMS AND METHODS FOR TRACKING AIRCRAFT".

INCORPORATION BY REFERENCE

The disclosures made in U.S. Provisional Application No. 63/280,851, filed Nov. 18, 2021, are specifically incorporated by reference herein as if set forth in its entirety.

TECHNICAL FIELD

In one aspect, the present disclosure is directed to surveillance systems and methods, and more specifically, to surveillance systems and methods that facilitate collection and analysis of electronic signatures associated with an aircraft. Other aspects also are described.

BACKGROUND

Airplanes and other aircraft typically are detected via one or more imaging devices. For example, radar systems have been utilized for years to track aircraft. Surveillance of aircraft in flight using such radar systems generally utilizes a primary radar system to detect and provide an indication of aircraft within a covered airspace, and a secondary radar system to communicate with the aircraft, such as receiving the aircraft transponder signal, for identification of aircraft detected by such radar systems. There are, however, limitations to the ability of radar to track and locate an aircraft, e.g. altitude of the aircraft, and such systems generally are large and expensive, requiring one or more large and costly antennas to be utilized. Satellite tracking also is used and can obtain images of the airplane to be utilized for detection via an operations center. However, such satellite images, may not always be available and such systems are expensive to implement.

There further exist other systems for detecting aircraft, particularly commercial and private airplanes, based on known and/or frequently used signal emissions. Typically, each aircraft has a transponder that emits an identifying signal for the aircraft. In addition, aircraft also may include Automatic Dependent Surveillance-Broadcast (ADS-B) may gather a global positioning satellite (GPS) to determine an aircraft's position and transmit such a signal, including other data such as an identification code, to the operations center. Such a signal may be transmitted at specified frequencies, for example at 978 MHz or 1090 MHz. However, smaller aircraft may not include an ADS-B. However, the range of the ADS-B broadcast of the identity and position of aircraft is, like ground-based radar systems, are limited to a line-of-sight or to the horizon, and generally will not provide an indication or identification of persons on-board the aircraft. Further, the transponder and/or ADS-B of an aircraft may be disabled or removed to avoid detection and identification, and is directed to tracking the specific aircraft, not other devices that may be associated therewith.

It can be seen that a need exists for surveillance systems and methods that can be used to provide for more precise, reliable, and/or consistent identification, and/or analysis of various types of aircraft and persons within the aircraft.

The present disclosure is directed to the foregoing and other related, and unrelated, problems in the relevant art.

SUMMARY

Briefly described, the present disclosure is directed to surveillance systems and methods for collecting electronic signatures and/or signals of aircraft and electronic devices associated with the aircraft, for identification of aircraft and the presence or absence of one or more devices or persons associated therewith within a prescribed or selected location, area or range of operation. Further, electronic signatures and/or signals of other vehicles proximate to the aircraft or landing area associated with the aircraft may be collected.

Such systems and methods may include a low power, portable, deployable, and/or covert configurations or packages. The surveillance system may be deployed near or proximate to a location with known air traffic, and in particular, near or within a range of operation or location/area where potential known or suspected targets of interest may be located. Targets generally refer to the aircraft, e.g., an airplane, drone, helicopter, or both. However, targets also can include other objects, such as one or more electronic devices, e.g. cell phones or other communication devices, RFID and other sensors or transmitting devices internal to vehicles or as after-market additions, and/or various other, similar devices. Further, targets can include other types of vehicles (e.g., cars, trucks, etc.) located at or near the location with known air traffic, without departing from the scope of the present disclosure.

According to aspects of the present disclosure, the surveillance system can include a plurality of deployable, covert and/or portable collection systems or assemblies that can be located at selected geographic area/location or range of operation, such as around an airfield. The surveillance system generally is configured to capture and/or facilitate collection of information related to electronic signatures associated with target devices in or moving about the selected area/location or range of operation, and use this collected information to identify the arrival or departure of an aircraft or person. Each capture or collection of electronic signature information may be associated with the identified aircraft, and can be stored locally in a memory with a capture time, date, and location data. The surveillance system may be small (e.g., portable) and indistinct (e.g., covert and/or concealable), and/or can communicate, along with location, classification and any collected electronic signature elements from the collected transmissions to one or more monitoring stations. Further, the surveillance system may be configured to look like a part of a natural landscape feature or an item common to the location or area where the surveillance system is positioned/placed.

According to aspects of the present disclosure, a surveillance system is provided, which can be configured as a concealable package to provide a covert or disguised appearance. The surveillance system will include one or more signal receivers within the concealable package and configured to scan for selected electronic signature signals emitted from aircraft within the range of operation. The received/detected electronic signature signals can correspond to one of the one or more signal receivers. The surveillance system further can include communications circuitry configured to transmit to and receive signals from an operations center.

In embodiments, the surveillance system can include one or more signal processors in signal communication with the one or more signal receivers, which one or more signal processors also can be positioned within the concealable package. The one or more signal processors are configured to execute instructions from memory for monitoring the one or more signal receivers for receipt of detected electronic signature signals based on the scans performed by the one or more signal receivers. The executed instructions from memory can classify received electronic signature signals, and in embodiments, can store the received signals in the memory together with an associated location, signal receiver detecting the signal, and other information such as date, time, type of signal, etc. The executed instructions from memory can then direct or cause transition, via the communications circuitry, of the received signals to the operations center.

In one aspect, the surveillance system can include an on-board or internal power source, which can be included in the concealable package and configured to provide power to the one or more signal receivers, the one or more signal processors, and the communications circuitry. The one or more signal processors, prior to detection of signals, can further be placed into a sleep or low-power state during period of no activity so as to utilize a minimum amount of power from the power source. The power source can provide a sufficient amount of power to the one or more signal receivers to scan for electronic signature signals from proximate aircraft.

Upon detection of a signal, the one or more signal processors can be transitioned from their sleep or low-power state to a powered on state. In such embodiments, the power source can provide a sufficient amount of power to maintain the powered on state of the one or more signal processor for a period of time sufficient to execute the instructions.

In embodiments, the surveillance system can include a solar power source, connected to the power source and external to the concealable package, e.g. solar cell or array of solar cells that can be deployed for changing an internal power source (such as a battery, etc. . . . ) for the surveillance system.

In an aspect, the one or more signal processors includes one or more of a Bluetooth-based radio, radio receiver, a RFID reader, a WiFi radio receiver, a spectrum analyzer, a narrow-band radio transmission detection apparatus, or GPS equipment.

In an aspect, The one or more signal receivers with scan for signals substantially continuously or intermittently.

According to other aspects of the present disclosure, a method includes detecting an aircraft based on signals emitted via electronic devices proximate to the aircraft. The method can include scanning, which can occur continuously or can be intermittent, via one or more signal receivers, for signals emitted from one or more electronic devices within an aircraft, and which can be used to determine an electronic signature of the device(s). The method can also include powering on one or more signal processors; classifying, via the one or more signal processors received signals and forming associated data records; storing, via the one or more signal processors, the signal and associated data records (e.g. aircraft identification, time, date, location, etc.) in a memory; powering on communications circuitry; and transmitting, via the one or more signal processors and the communications circuitry, the signal and associated data to an operations center.

In another aspect, the one or more signal receivers can be operated at low power levels. Power can be provided via a power source, which include one or more of an external or an internal power source, and has a battery or capacitor based power source.

In embodiments, after transmitting the signal, the method may include transitioning the one or more signal processers and the communications circuitry to a sleep state or low power mode.

According to some aspects of the disclosure, the electronic devices include one or more of electrical on-board aircraft equipment, an aircraft beacon, or personal computing devices separate from the electrical on-board aircraft equipment and on-board the aircraft. Further, the one or more personal computing devices can include a cellular phones and/or other communication devices, tablets, laptops, smart watches, fitness trackers, wireless headphones, RFID tags (e.g., key cards, library books, asset tags, pallet transmitters, pet collars), Wi-Fi hot spots, handheld electronic entertainment systems, or any other personal electronic device.

In another aspect, the one or more signal processors, one or more signal receivers, and communications circuitry are included in a concealable or covert package.

In embodiments, the surveillance system comprises a concealable or covert package configured to be smaller than a typical aircraft scanning device. In addition, the data associated with an identified target aircraft and selected electronic device signals received therefrom generally will include one or more of a location, proximity to the one or more signal receivers, a time and date the signal is detected, manufacturer identification, device type, known associations such as the aircraft by transponder or other identifier, and other selected data elements or identifiers. In another example, the one or more signal receivers can scan for signals external to an identified aircraft. The signals external to the aircraft can include on or more of other transportation vehicles and/or electronic devices associated therewith and with the identified aircraft.

In another aspect, the surveillance system can detect a plurality of signals associated with a particular identified aircraft and one or more electronic devices in proximity to or within the aircraft. When classifying such electronic devices, a tag or identification number and/or characters can be associated with a particular aircraft, and/or correlated with a target identifier. The tag or identification number and/or characters can track particular targets associated with the particular identified aircraft.

In addition, the one or more signal receivers can include one or more sensor assemblies such as one or more antennas or other receivers, e.g. a Bluetooth® antenna, a WiFi antenna, a RFID antenna, or other RF antennas or combinations thereof, configured to capture information related to electronic signature signals associated with the targets and which can be used to identify the target(s) or target devices.

In some aspects, the surveillance system can be configured to capture sample electronic signature information from a target, associate that information with target identification information, and then search for or generate an alert on receipt of similar electronic signature information at the operation centers.

In additional aspects, the surveillance system can be configured to allow for search inquiries or scans of electronic signatures associated with known or monitored targets to search known location data points to determine possible movements of such targets.

In still other aspects, the surveillance system can be configured to allow for labeling of specific electronic signatures with a target and then alert or search for history of those specific electronic signatures in a database, placing the target at various locations.

In further aspects, the surveillance system further can indicate or determine changes in association or travel of suspects or other individuals of interest based on variations in electronic signatures associated with a target or targets.

In embodiments, the data collected by the surveillance system and associated with identified particular targets can be presented in a graphical user interface (GUI) at the operations center. The list of detected signals and associated data can be searched and/or filtered. The GUI can allow for further classification of detected signals.

In embodiments, the surveillance system can include a port or physical communications port. Such a port can be connected, via cable, to computing device. Detected signals in memory and associated data can be transferred to the computing device for further analysis. In such aspects, the surveillance system can be transported to the computing device.

According to other aspects of the disclosure, a signal collection and identification assembly deployable to an airfield or other location comprises one or more signal receivers configured to scan for signals from proximate aircraft. The signals may comprise a range of signal frequencies, communications protocols, or combinations thereof, specific to electronics commonly associated with selected aircraft, vehicles, or personal electronics. The signal collection and identification assembly may comprise one or more signal processors in signal communication with the one or more signal receivers, the one or more signal processors configured to execute instructions from memory to (1) monitor the one or more signal receivers for one or more detected signals indicative of one or more signal frequencies, communications protocols, or combinations thereof, associated with the selected aircraft, vehicles or personal electronics collected from the scans performed by the one or more signal receivers; (2) classify the detected signals to determine a likelihood of a presence of an identifiable aircraft, vehicle, person or personal electronic device within a range of operation of the surveillance system; and (3) store the received signals in memory with an associated location.

In other aspects, the signal collection and identification assembly may comprise a portable and deployable package. The portable and deployable package may include a camouflaged covering based on a surrounding environment. The camouflaged covering may be configured to resemble one or more of a natural element, trash, or a common item.

In other aspects, the signal collection and identification assembly may include or comprise a communications circuitry configure to transmit received signals to an operations center. The signal collection and identification assembly may include or comprise a power source. The power source may comprise at least two replaceable batteries or energy storage devices. One of the two replaceable batteries or energy storage devices may be received within the portable and deployable package Various objects, features, and advantages of the present disclosure will become apparent to those skilled in the art upon a review of the following detail description, when taken in conjunction with the accompanying drawings.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced; and it will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 shows an exemplary screen shot of an interface associate with the surveillance system according to FIG. 1 and/or FIG. 2.

The use of the same reference symbols in different drawings indicates similar or identical items.

DETAILED DESCRIPTION

Figure 1:
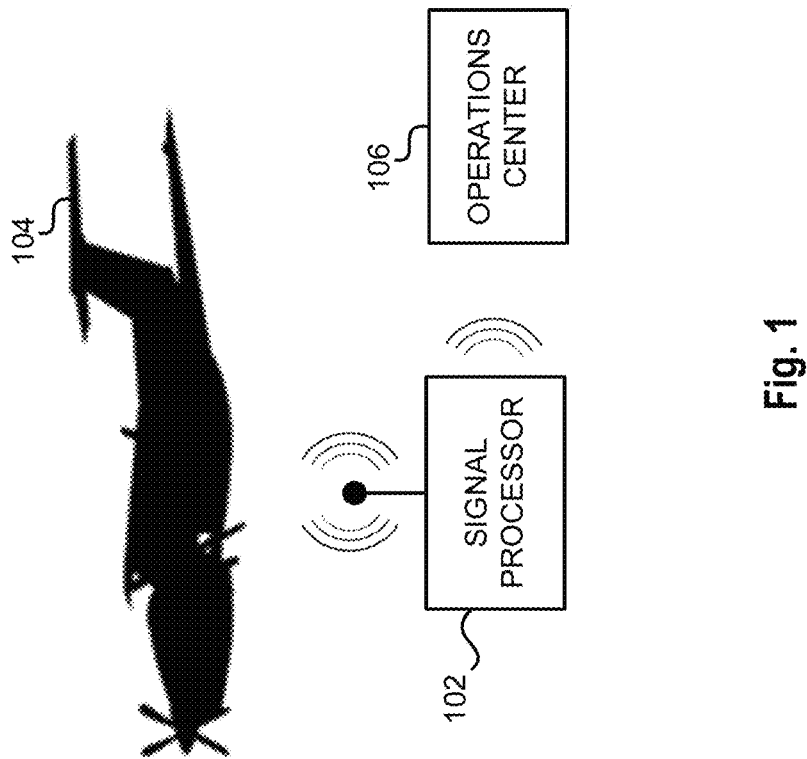
FIG. 1 is a schematic diagram of a surveillance system according to the present disclosure.

The following description in combination with the Figures is provided to assist in understanding the teachings disclosed herein. No attempt is made to show structural details of this disclosure in more detail than may be necessary for a fundamental understanding of the exemplary embodiments discussed herein and various embodiments in which they may be practiced. While the description is focused on specific implementations and embodiments of the teachings, and is provided to assist in describing the teachings, this focus should not be interpreted as a limitation on the scope or applicability of the teachings disclosed herein. Those skilled in the art will recognize that many modifications and adaptations to the embodiments described are possible and may even be desirable in certain circumstances.

Thus, the following description is provided as illustrative of the principles of the embodiments and not in limitation thereof. The phraseology and terminology used herein is for the purpose of description and should not be regarded as limiting. As used herein, the term "plurality" refers to two or more items or components. Terms such as "comprising," "including," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," when present, are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

In embodiments, the present disclosure is directed to surveillance systems and methods for detecting an aircraft, devices or electronic devices associated with or proximate to an aircraft, and/or other vehicles, including electronic devices associated with the other vehicles, nearby or proximate to an aircraft or aircraft landing area, or other range of operations. Such electronic devices may include personal electronic devices located within or proximate to an aircraft and/or the other vehicles. Accordingly, in embodiments, the surveillance systems and methods described herein are utilized for detection of signals indicative of or which can be used to determine electronic signatures of such electronic devices that can be captured and associated with known or identified aircraft, and potentially other nearby vehicles. Further, based on continuous collection of data over periods of time, trends and patterns can be formed and electronic devices associated with particular vehicles and/or aircraft at various times.

As noted, different electronic devices may be associated with particular vehicles, e.g. aircraft such as airplanes (shown at 104 in FIG. 1), drones, helicopters, and other vehicles, at various times. Such associations also may aid in determination of individuals associated with particular vehicles, in addition to when those individuals are nearby or are within such vehicles and/or aircraft. Additionally, the systems and methods described herein are configured to facilitate detection of an aircraft. Further, based on the associations of particular electronic devices (e.g. identified by their electronic signatures) with specific vehicles e.g., aircraft, and known locations or ranges of operation of the surveillance system, other associations may be created, which can be used to help provide an indication of whether a particular individual may have been a potential witness to or have been involved in an incident, e.g. a crime, accident, etc., occurring at a certain location at a certain time and/or date.

FIG. 1 is a schematic diagram of a surveillance system 100 according to the present disclosure. As illustrated, the surveillance system 100 generally will include a signal processor 102. The signal processor 102 will be configured or operable to scan for or include circuitry to scan for signals and generate identification data based on any electronic devices present within or nearby a selected or identified aircraft 104 vehicles within a range of operation such as a landing area of the aircraft. The signal processor 102 may connect to an operations center 106 and send detected electronic device signals, along with additional information/generated data, to an operations center 106. For example, as an aircraft 104 (e.g., a small airplane) approaches a runway, the signal processor 102, located proximate or nearby the runway, may begin to scan for and locate signals (e.g., from various electronic devices that can be used as signature signals for such devices). If a signal is found, the signal processor 102 may determine the type of signal, the location of the signal, the time the signal was located, the date the signal was located, and/or other characteristics of received electronic signals, which can be filtered to create an electronic signal signature for a target device to be identified. Filtering can refer to the consolidation or elimination of identical or equivalent signals or detection sources. Filtering, as described, can reduce the amount of memory, data transmission, and power utilized without losing identifying information or characteristics. Further, filtering can eliminate local stationary signals and sources such that signal processor 102 filters or eliminates background signals, thus allowing target signals to be easily recognizable in conjunction with aircraft 104 presence, arrival, and/or departure.

Once the signal and its characteristics/associated data are determined, the signal processor 102 may store the signal and characteristics/associated data and/or transmit the signal and its characteristics/associated data to the operations center 106.

In an embodiment, the aircraft 104 may include an airplane, a helicopter, a drone, or other type of aircraft. The aircraft 104 may be manned or unmanned. The aircraft, and/or electronic devices within or associated therewith may also be referred to as a target within this disclosure. The aircraft 104 may also include other electrical equipment or electronic devices that emit signals detectable via the signal processor 102, and which can be used to build a signature or identification profile for the aircraft and target devices associated therewith.

In an embodiment, the signal processor 102 may be included in a covert or concealable and/or camouflaged package. The signal processor 102 may be placed nearby a location known to be utilized as a runway or air field. In such examples, the signal processor 102 may be hidden, concealed, or camouflaged so as to not be readily recognizable. The signal processor 102 may be packaged and/or include a cover configured to blend in with the landscape or may be configured or disguised to look like a part of a natural landscape feature or an item common to the location or area where the surveillance system is positioned/placed (e.g., trash or other common items).

In an embodiment, the signal processor 102 may operate at reduced/low or ultra-low power. The circuitry (described below) utilized to detect signals can be powered on, at least partially, to scan for signals, for example, at times intervals or in response to a trigger or signal indicating an active site condition. The remaining circuitry of the signal processor 102 may be powered off or in a sleep state. Once a signal is detected, the remaining circuitry may be powered on to perform additional signal processing operations, such as signal classification (e.g., determining type of signal and/or other characteristics or associated data) and/or data transmission to an operations center 106. Once such signal processing operations have been performed, the remaining circuitry may be powered down or transitioned to a sleep state.

In embodiments, the signal processor 102 may be connected to an external power source; and in some embodiments, the surveillance system can be provided with an internal or portable power source. For example, such an internal power source may include one or more batteries and/or capacitor based energy storage devices, and in embodiments, the power source also may be connected to a secondary power source. The secondary power source may include a concealable or hidden solar panel to charge or provide additional power to the power source or the energy storage device.

The operations center 106 generally will include one or more computing devices, one or more databases, and/or some combination thereof, and can be at a location remote from the signal processor. Data collected by the signal processor can be communicated to the operations center wirelessly, by an internal modem or WiFi card, or by a direct connection. As data is transferred to the operations center 106 from the signal processor 102, the data may be formatted in such a way as to show correlations between signals, different data types, and other information.

In an embodiment, the signal processor 102 and components packaged or included therewith may be considered the surveillance system. In yet another embodiment, the surveillance system may include the operations center 106 and/or other components. Further, the surveillance system may include a plurality of signal processors and components packaged or included therewith each positioned proximate one or more locations. In another embodiment the signal processor 102 and components packaged or included therewith may be referred to as a collection assembly, collection system, collection apparatus, and/or a signal collection and identification assembly.

Figure 2:
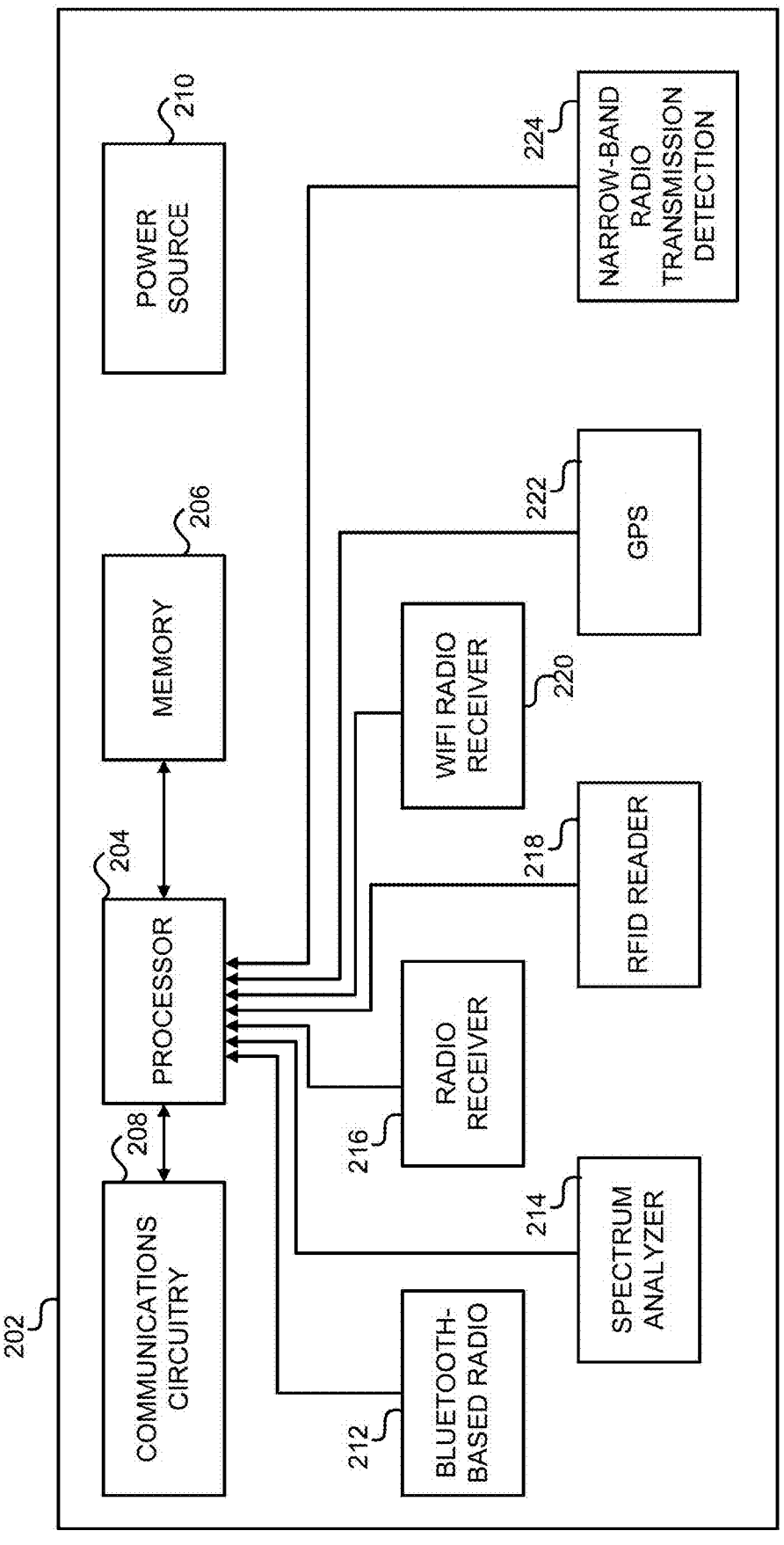
FIG. 2 is another schematic diagram of a surveillance system according to the present disclosure.

FIG. 2 is a schematic diagram of a surveillance system 202 according to the present disclosure. In the illustrated embodiment and/or in other embodiments, the surveillance system 202 can be provided as a package, system, collection package, collection system, collection apparatus, collection assembly, or signal collection and identification assembly that can be completely or substantially self-contained, and further can be configured to be concealable or camouflaged so as to be substantially undetectable and/or covert. Further, such a package or system can be configured to blend in with the landscape or surrounding area. In another embodiment, the package or system can be configured to look like a part of a natural landscape feature or an item common to the location/area (e.g., trash or other items) or range of operation where the surveillance system 202 is positioned/placed (e.g., at or near an airport or landing field for target aircraft). In other embodiments, the package or system can be portable, deployable, and/or compact. Such packages or systems can be easily transported, deployed, and/or installed or set-up and various, remote locations, and can be provided with an internal or accompanying power source, or can be connected to an external power source at the location where the surveillance system is deployed. The surveillance system 202 may include a plurality of packages or systems each positioned proximate to an air or landing field and/or other location. Thus, in such an embodiment, each of the plurality of packages or systems may obtain similar and/or different data from one or more various targets.

In an embodiment, the package or system can be smaller than a typical scanning device. For example, the device may be about 1 inch×about 1 inch×about 14 inches, about 2 inches×about 2 inches×about 14 inches, about 3 inches× about 3 inches×about 14 inches, about 4 inches×about 4 inches×about 14 inches, about 1 inch×about 2 inches×about 12 inches, about 2 inches×about 4 inches×about 12 inches, or about 4 inches×about 6 inches×about 12 inches. The package or system may be shaped like a small rectangular box or some other shape (e.g., round, oblong, square, irregularly shaped, etc.). The package or system may be covert, in other words, disguised or camouflaged to look like a natural element, like trash, or other common items that may be ignored.

As indicated in FIG. 2, the surveillance system 202 will include a series of sensors and/or signal receivers 203, such as a number of antenna, receivers, readers, and/or other circuitry for collection of electronic signals for analysis and development of electronic signatures for identification of the presence of absence of a target, e.g., an aircraft, previously identified electronic device, or a person within a selected location or range of operation. The signal receivers collect a range of signal frequencies and communications protocols specific to electronics most commonly associated with aircraft, vehicle or personal electronics; and the processor 204 will analyze the set of signals and proximity according to programmed instructions and determine the real-time likelihood of the presence of a person and/or a target aircraft at such location or within the range of operation.

As indicated in FIG. 2, the signal receivers of the surveillance system 202 may include a Bluetooth-based radio or receiver 212 or antenna. The Bluetooth-based radio or receiver 212 or antenna may be configured to scan for and/or detect proximate Bluetooth signals. Such a Bluetooth signal may operate in a 2.4 GHz spectrum band. The Bluetooth-based radio or receiver 212 or antenna may be configured to detect Bluetooth signals within about 5 feet to about 300 feet, about 5 feet to about 250 feet, about 5 feet to about 200 feet, about 10 feet to about 300 feet, about 10 feet to about 250 feet, about 10 feet to about 200 feet, about 15 feet to about 300 feet, about 15 feet to about 250 feet, about 15 feet to about 200 feet, about 20 feet to about 300 feet, about 20 feet to about 250 feet, about 200 feet, about 250 feet, or about 300 feet. The Bluetooth-based radio or receiver 212 or antenna may be configured to consume a minimum amount of power, while maintaining the capability to scan for signals.

In embodiments, the signal receivers of surveillance system 202 also will include a spectrum analyzer 214 to determine various characteristics of received but unknown signals. The spectrum analyzer 214 may measure the magnitude of a signal versus frequency to determine a potential source of the signal. In such examples, the spectrum analyzer 214 may provide additional data or characteristics of located or found signals.

In some embodiments, the signal receivers of the surveillance system 202 can include a radio receiver 216. The radio receiver 216 may scan for various radio signals. The radio receiver 216 may scan for signals continuously or intermittently. Similar to the Bluetooth-based radio receiver or receiver 212, the radio receiver 216 may be configured to operate at low power. The radio receiver 216 may scan a number of frequencies associated with communication, such as the citizens band frequencies, ranging from about 26 MHz to about 28 MHz, or two-way radio frequencies, ranging from 136 MHz to 900 MHz frequency range. Other radio frequencies may be monitored, such as emergency services or police frequencies. The range of such a radio receiver 216 may be from about 1 mile up to about 25 miles. Such a range may be enhanced by the inclusion of an extender, repeater, or booster. In other words, the surveillance system 202 may include an extender, repeater, or booster to increase signal detection range.

The surveillance system 202 additionally may include a radio frequency identification (RFID) reader 218 as another sensor or signal receiver. The RFID reader 218 may be configured to detect RFID signals from RFID enabled tags or devices. The RFID enabled tags or devices can include passive or active RFID tags or devices. Such RFID enabled tags or devices may operate at varying frequencies, such as 125 KHz, 134 KHz, 13.56 MHz, 433 MHz, 806 MHz to 956 MHz, 2.45 GHz, or 5.6 GHz. The RFID reader 218 may read RFID signals within about 1 foot to about 5 feet. Since the range for RFID detection may be limited, nearby or proximate RFID signals may be detected. In another embodiment, the surveillance system 202 may include a RFID range extender or repeater. In such embodiments, the range of RFID reads may be increased to up to about 100 feet or up to about 200 feet. In another embodiment, if ultra-high frequency RFID tags (UHF RFID) are present, read ranges can be increased to about 75 feet-100 feet with the directional antenna configuration. In an embodiment, if an RFID signal of a particular component, tag, or device is detected and read, the resulting data may include, but not be limited to, a location of the component or device, a serial number of the component or device, a manufacturer, a photo, a use history, a maintenance schedule, and/or other data stored in the RFID tag or RFID enabled device.

The surveillance system 202 further may include a WiFi radio receiver 220. In such examples, the WiFi radio receiver 220 may scan and detect any available WiFi signals. The WiFi signals can operate at 2.4 GHz and/or 5 GHz. Such signals may originate from mobile hotspots. A mobile hot-spot may be an electronic device; such as a cellular phone or dedicated hotspot, that utilizes cellular signals (e.g., 4G, 4G LTE, 5G, etc.) to provide WiFi signals to other devices. Typically, a WiFi signal may be password protected. How-ever, the mere indication of a WiFi signal and any other data that may be gathered based on the WiFi signal without a password may indicate nearby or proximate electronic devices in locations where such signals are not typically available.

In embodiments, the surveillance system 202 may include a global position system (GPS) 222. The GPS 222 may be utilized to determine the current location of the surveillance system 202. Since the surveillance system 202 is portable and/or deployable, the surveillance system 202 may be moved at varying times. Once any of the signals described herein are discovered or located, a GPS signal may be generated for the surveillance system 202, to determine location of the surveillance system 202. Further, a GPS signal may be generated for a detected signal based on the location of any of the signals detected.

Still other sensors or signal receivers used in the surveil-lance system 202 may include a narrow band radio trans-mission detection device 224. The narrow band radio trans-mission detection device 224 may be configured to scan and detect particular frequencies, such as frequencies at the 12.5 KHz bandwidth. The narrow band radio transmission detec-tion device 224 may scan one or more channels, each channel defined by a set of frequencies. In an embodiment, one narrow band radio transmission may include a software defined radio (SDR) signal operating at narrow band fre-quencies. SDR includes the implementation of functions in software using general-purpose hardware which are typi-cally implemented in special-purpose hardware. In such examples, signals generated in software using the general-purpose hardware can be transmitted via an antenna of a particular device.

The signal processor also generally will be coupled to a power source 210 that may be an internal power source packaged with the portable surveillance system. The power source may be an energy storage device. Such an energy storage device may include a battery or capacitor based energy storage device. Further, a second or secondary power source may connect to the power source 210, such as a solar panel or solar cell. In such examples, the solar panel or other power generating device may be concealed (e.g., via cam-ouflage) or hidden along with the surveillance system 202. In another example, the power source 210 may be inter-changeable. The power source may be comprised of two hot-swappable, redundant energy storage devices. For example, two batteries may be utilized as the power source. During operation of the surveillance system 202, a first battery may provide power, while a second battery stands-by as a back-up if the first battery fails or is depleted. Further, either the first or second battery may be replaced during operation of the surveillance system 202. In addition, the surveillance system could also be coupled to an external power source for operation and/or for charging any batteries as a back-up.

In an embodiment, the power source 210 may be config-ured to provide, when the one or more signal processors are in a low-power mode, a minimum amount of power suffi-cient to enable one or more signal receivers to scan for signals from proximate aircraft. In embodiments, the one or more signal receivers can be configured to scan for signals within a range that can be selected to provide a clearer reception of the signals for identification with specific aircraft or electronic devices; for example, at a range of about 100-500 yards or less, and in embodiments, at a range of 100 yards or less. The power source 210 may, upon detection of a signal, be configured to provide a sufficient amount of power to transition the one or more signal processors to a powered on state, (e.g., the signal processors can be activated or a connection between the one or more signal processors and the power source can be established or re-established to supply power to the one or more signal processors) and maintain the powered on state of the one or more signal processor for a period of time sufficient to execute the instructions.

The surveillance system 202 further will include a memory 206 and a processor 204 or one or more processors. The memory 206 may store instructions executable by the processor 204 or one or more processors. In an example, the memory 206 may be a non-transitory machine-readable storage medium. As used herein, a "non-transitory machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory 206 may store or include instructions executable by the processor 204. As used herein, a "processor" may include, for example one processor or multiple processors included in a single device or distributed across multiple computing devices. The processor 204 may comprise at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communications with/from electronic devices, such as by hard wiring two components together or wireless commu-nication, as understood by those skilled in the art. For example, wireless communication may be Wi-Fi®, Blu-etooth®, ZigBee, or forms of near field communications. In addition, signal communication may include one or more intermediate controllers or relays disposed between ele-ments that are in signal communication with one another.

The memory 206 may include programming or instruc-tions to cause each of the sensors in the surveillance system 202 to scan a range of signal frequencies and communica-tions protocols for collection of signals specific to electron-ics most commonly associated with aircraft, vehicles or personal electronics substantially continuously or intermit-tently. In an example, the processor 204 may execute mini-mal instructions during signal scanning to conserve power, as the surveillance system 202 may be placed at a location for an extended period of time. Upon detection of a selected or responsive signal, a wake up or "power on" instruction/direction may be generated by any of the circuitry included therewith to cause the processor 204 to transition from a sleep state to a powered on state. The processor 204 may then begin to execute other instructions or programming. The other instructions may include classifying any signals found. For example, when a signal is detected, the processor 204 may cause the GPS 222 to generate a location. Further, a time, day, and/or date may be set for the detected signal.

Once a set of signals and communications protocols specific to electronics most commonly associated with aircraft, vehicle or personal electronics have been detected and collected over a given interval (e.g. time) or for a detected event such as landing of an aircraft, the processor 204 will execute instructions from memory 206 to analyze the set of signals and proximity/location of collection/detection; and can determine the real-time likelihood or probability of the presence of a person, aircraft, and/or other vehicles at such location. In other words, the surveillance system can determine the likelihood or probability that an aircraft is present; the likelihood or probability that people or other vehicles are present; the correlation and/or association between people, vehicles, and/or aircraft; and/or whether a particular person or people arrived and/or departed via an aircraft. The analyzed sets of signals further can be classified based on selected criteria and stored in memory 206 together with associated classification data. In an embodiment, the processor 204 may end instruction execution at that point and transition back to the sleep state. In such examples, the data may be stored on the surveillance system 202 until the surveillance system 202 is picked up and brought to an operations center. The data stored in the surveillance system 202 may then be transferred to another computing device.

In another embodiment, the surveillance system 202 may include communications circuitry 208. The communications circuitry 208 may be configured to transmit electronic signal identification or signature data to an operations center. In such examples, once a signal is detected and classified, the related data may be transmitted to the operations center. Further, the related data may be transmitted, via the communications circuitry 208, once any detected signals are out of range, to prevent potential scanning or detection of the surveillance system 202. In embodiments, batch sets of data may be transmitted to the operations center at specified time intervals.

In other embodiments, the communications circuitry 208 may receive commands or instructions from an operations center. Such commands or instructions from the operations center may include when to scan for signals, rather than substantially continuous or intermittent scanning. The commands may also include directions as to when to transfer data from the surveillance system 202 to the operations center. For example, the operations center may periodically transmit a signal, command, or instruction to the communications circuitry indicating an initiation of transfer of data stored in memory 206 to the operations center. Another command may include which type of signal to scan for and/or which circuit (e.g., Bluetooth-based radio or receiver 212, radio receiver 216, etc.) to utilize.

FIG. 3 shows an exemplary screen shot of an interface associated with the surveillance system 202 according to FIG. 1 and/or FIG. 2. The signals detected and associated data may be utilized by the operations center to generate a graphical user interface (GUI) 300. The GUI 300 may include various data points presented in a tabular or other format. The GUI 300 may include a signal column 302, which may represent, by a unique identifier or other indicator, located or found signals. The GUI 300 may include a count column 304 indicating when such a signal was detected in relation to the other signals detected. The GUI 300 may include a service UUID column 308, include a service UUID if one is associated with or available in relation to a detected signal. The GUI 300 may include a signal type column 308 to list the type of signal that a located or determined signal is, if known.

While FIG. 3 illustrates a plurality of Bluetooth signals, it will be understood that various other types of signals, as described herein, may be located or found. The GUI 300 may include a column 310 for the last read time of a particular signal. In such embodiments, a signal may be read more than once and stored under the unique identifier. The GUI 300 may include a manufacturer data column 312 (e.g., a device manufacturer) and an alias column 314. The date in the manufacture data column 312 and/or the alias column 314 may be included in the signal or added later by a user.

In another embodiment, other data may be read or determined from detected signals. For example, a Bluetooth signal may include a Bluetooth address (e.g., see column 316), a Bluetooth address type (e.g., see column 318), whether the signal is scannable (e.g., see column 320), and/or an advertisement type (e.g., see column 322). Other columns including data relevant to a located or found signal may be included in the GUI 300.

In another embodiment, the GUI 300 may include various filters to allow a user to view different data sets. For example, the signals may be filtered based on signature 326, Bluetooth address 328, and/or scan type 330. The GUI 300 may include clear results button 324 and/or a clear filter button 332 to reset the data set displayed in the GUI 300.

In another embodiment, the GUI 300 may include a button 334 to start a scan and a button 336 stop a scan. The GUI 300 may include an option or button 338 to allow a user setup an alias for a particular signal. Finally, the GUI 300 may include a button 340 to allow a user to view any reads that may have been made at any particular time or for a particular surveillance system.

The GUI 300 may also include any relationships between aircraft, vehicles, and persons of interest. For example, a signal may be detected that indicates an aircraft has just landed. Additionally, signals indicating vehicles are located nearby may be detected. In such examples, the GUI 300 may include a column to indicate that the vehicles and aircraft are related or should be associated with one another. As data is collected over time, a user may be able to utilize the filters in the GUI 300 to view such relationships and trends (e.g., person A is always located proximate to an aircraft and vehicle A and vehicle B at the $2^{nd}$ of each month at 3 AM, etc.). In another embodiment, relationships and trends may be determined by the operations center upon reception of data. Other data from other detection devices may further be utilized to form additional relationships or trends over periods of time and/or between different targets, vehicles, and/or electronic devices.

Figure 4:
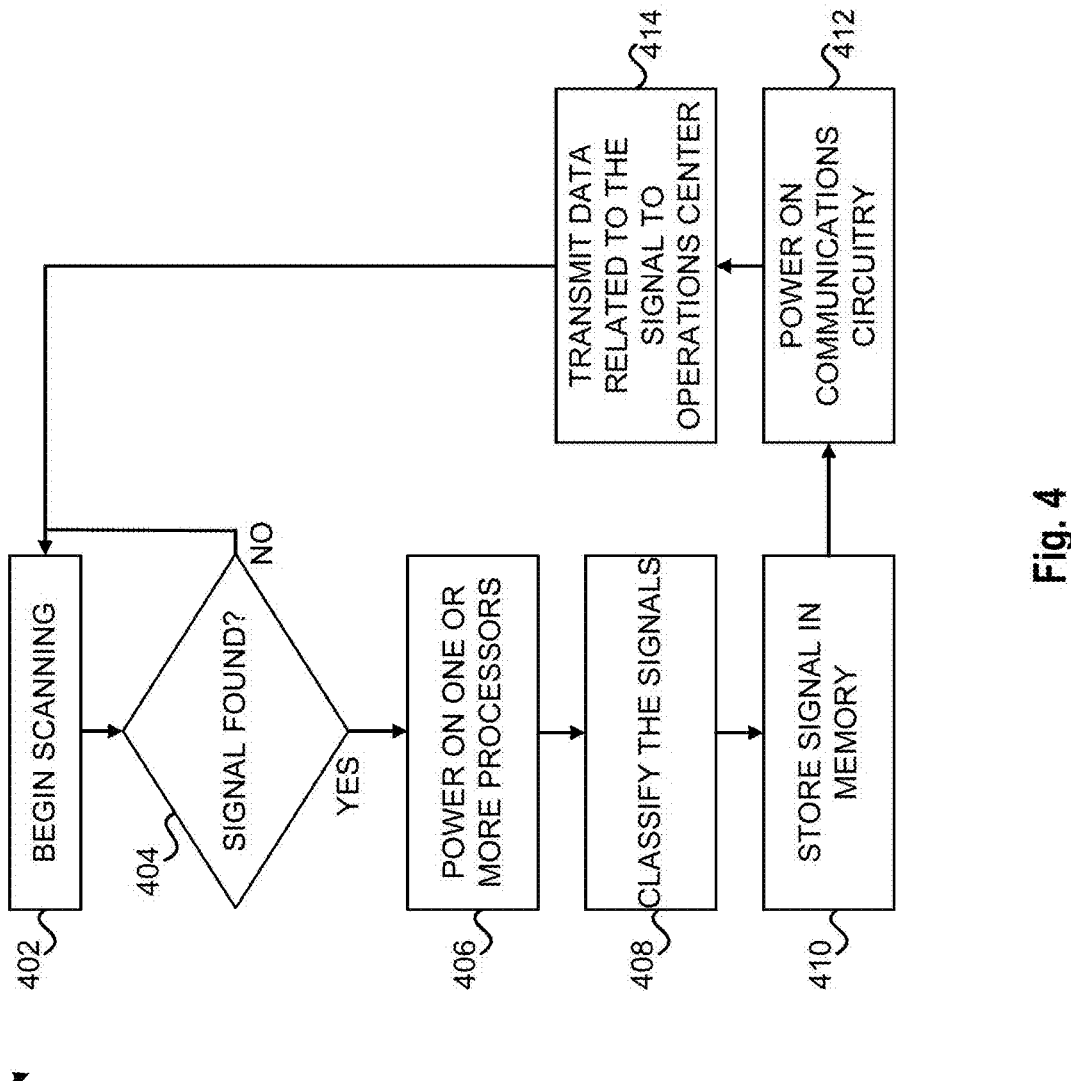
FIG. 4 is a flow diagram of a process as performed by the surveillance system according to FIG. 1 and/or FIG. 2.

FIG. 4 shows a flow diagram, implemented in a signal processor or other computing device of the surveillance system for performing surveillance operations, according to an embodiment. The method is detailed with reference to the surveillance system 202 of FIG. 2. Unless otherwise specified, the actions of method 400 may be completed within the surveillance system 202. Specifically, method 400 may be included in one or more programs, protocols, or instructions loaded into the memory 206 of the surveillance system 202 and executed on the processor 204 or one or more processors of the surveillance system 202. The order in which the operations are described is not intended to be construed as a limitation, and any number of the described blocks may be combined in any order and/or in parallel to implement the methods.

At block 402, the surveillance system 202 may transmit a signal for each of the sensors or signal receivers 203 (e.g., Bluetooth-based radio or receiver 212, radio receiver 216, etc.) to begin scanning for a range of signal frequencies and communications protocols specific to electronics most commonly associated with aircraft, vehicle or personal electronics, with each type of sensor scanning for a respective signal frequency or communications protocol. The initiation of a scanning operation may be based on an instruction in memory 206 or be communicated from an operations center, e.g. an air traffic control center or tower at an airfield in response to an incoming aircraft. The signal frequencies and communications protocols may be scanned for substantially continuously. In other words, each circuit may continuously search for its respective signal. In another embodiment, the circuit may scan for signals intermittently. For example, a circuit may scan for signals every 10 seconds, 20 seconds, 30 seconds, at 1 minute, 2 minutes, 5 minutes, 10 minutes, 30 minutes, 1 hour, or some other specified time period interval.

At block 404, the surveillance system 202 may determine whether and what signal frequencies and/or communications protocols have been found and collected. In another embodiment, such an instruction may be executed by the respective sensor. In other words, a particular sensor may determine whether a signal type associated with that type of sensor has been detected and may send or transmit a signal indicating that a signal has been found or located to the processor 204 of the surveillance system 202. For example, the Bluetooth circuit may determine whether a Bluetooth signal has been detected. If no signal has been detected, the circuits may continue to scan for signals at the specified time interval (e.g., substantially continuously or intermittently).

At block 406, if a signal has been detected or found, the circuits may transmit a signal to the processor 204, the signal indicating that the processor is to transition to a powered on state. The processor 204 may, while no signals are detected be in a sleep state. Such a state may conserver power, extending the life of a power source 210 or energy storage device. Once additional operations are to be performed (e.g., when a signal is found), the processor 204 may be transitioned to a powered on state. In another embodiment, the processor 204 may operate or be in a powered on state continuously. In such embodiments, the processor 204 may be a low power processor capable of operating for an extended period of time, depending on the type of power source 210 energy storage device. Further, in such embodiments, no signals may be generated to indicate power on or sleep state transitions.

At block 408, the found or detected signals may be classified. For example, a time stamp and/or date for when the signal was found may be generated. Location data may be generated (e.g., via GPS) and associated with the signal. Other data may be generated, such as a unique ID for a particular device. In an embodiment, the processor 204 may search for other signals from the same device which may be stored in memory 206. In such an embodiment, the data associated with that device may be filled in for the newly found or detected signal. Further, in such embodiments, some targeted communication protocols (e.g., Bluetooth, WiFi, etc.) include packets of data sent between devices. The packets of data include a permanent or transitory identifier for the sending the device. As such, communications from a single device across a number of received data packets can be correlated and information inferred or directly contained in any of the data packets can be associated with the single device.

In an example, a Bluetooth source sending signals or packets exposes a manufacturer and model in portions of data communications (e.g., packets sent). Once a manufacturer identity is received, the manufacturer identity can be associated with a source persistently. Some devices change identity to avoid tracking, however, such information (e.g., manufacturer identity) can be used to determine longer-term identifiable characteristics associated with a device. By collecting and associating the attributes discussed in this example, including other attributes or signals discussed throughout, with a signal source, the surveillance system 202, or instructions within the surveillance system 202, can determine which signals likely come from a single device over time, even if such a device attempts to obscure the device's identity. At block 410, the signal and the data associated with the signal (e.g., data generated during classification) may be stored in memory 206.

At block 412, if the signal is to be transmitted directly to an operations center, then the communications circuitry 208 may be powered on. Similar to the sleep state of the processor 204, any circuitry not used regularly, may be transitioned to a sleep state to conserve power stored in the power source 210 or energy storage device.

At block 414, once the communications circuitry 208 has been powered on, the data may be transmitted to the operations center and/or any other location as necessary. In another embodiment, the data stored in memory 206 may remain in memory until the surveillance system 202 is taken from where it was placed and the data transferred to another computing device (e.g., either via wireless or wired connection) at an operations center.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A surveillance system comprising:

a portable, deployable system package comprising:

a plurality of signal receivers configured to scan for a plurality of electronic signature signals from proximate aircraft, the electronic signature signals comprising a range of signal frequencies and communications protocols specific to electronics commonly associated with selected aircraft, vehicles, or personal electronics;

wherein each of the signal receivers are configured to scan for a selected type of electronic signature signal;

one or more signal processors in signal communication with the signal receivers;

a power source connected to the one or more signal processors and configured to provide power to each of the signal receivers, the one or more signal processors, and a communications circuitry; and wherein the one or more signal processors are positioned within the package, and configured to execute instructions from memory to:

place the one or more signal processors in a sleep state prior to detection of the electronic signature signals;

monitor the signal receivers for one or more detected electronic signature signals indicative of a signal frequency or communications protocol associated with the selected aircraft, vehicles or personal electronics collected from scans performed by each of the signal receivers;

place the one or more signal processors in a powered on state upon detection of one or more electronic signature signals by one or more signal receivers of the plurality of signal receivers;

classify the detected electronic signature signals to determine a likelihood of a presence of an identifiable aircraft, vehicle, person or personal electronic device within a range of operation of the surveillance system; and store the detected electronic signature signals in memory with an associated location.

2. The system of claim 1, wherein the plurality of signal receivers comprise at least two different signal receivers including one or more of a Bluetooth-based radio; a radio receiver; RFID reader; WiFi radio receiver; spectrum analyzer; narrow-band radio transmission detection apparatus; GPS; or a combination thereof.

3. The system of claim 1, wherein the communications circuitry is configured to transmit the detected electronic signature signals to one or more monitoring stations.

4. The system of claim 1, wherein when the one or more signal processors are in the sleep state, the power source is configured to continue to provide a power sufficient to enable the signal receivers to scan for the electronic signature signals from proximate aircraft.

5. The system of claim 1, wherein, the power source is configured to provide a sufficient amount of power to transition the one or more signal processors to the powered on state from the sleep state, and maintain the powered on state of the one or more signal processors.

6. The system of claim 1, wherein the power source comprises a solar power source external to the package and electrically coupled to an internal power source within the package to provide power to the internal power source.

7. The system of claim 1, wherein each of the signal receivers are configured to scan for the selected types of electronic signature signals continuously or intermittently.

8. A method of detecting an aircraft or a person associated with the aircraft, comprising:

scanning, via a plurality of signal receivers, for a plurality of selected types of electronic signature signals, the electronic signature signals including a range of signal frequencies and communications protocols for electronics most commonly associated with the aircraft and one or more personal electronic devices within a proximity to the aircraft;

if one or more electronic signals are not detected during a selected time period, placing one or more signal processors in a sleep state prior to detection of the electronic signature signals;

wherein each of the signal receivers remain in a powered on state sufficient to continue to scan for the electronic signature signals while the one or more signal processors are in the sleep state;

in response to detection of a set of electronic signature signals emitted from the aircraft or one or more personal electronic devices within a proximity to the aircraft by one or more of the signal receivers of the plurality of signal receivers:

placing the one or more signal processors in a powered on state;

classifying, via the one or more signal processors, the set of electronic signature signals received from one or more signal receivers of the plurality of signal receivers and forming associated data records;

storing, via the one or more signal processors, the set of electronic signature signals and associated data records in memory; and transitioning the one or more signal processors back to the sleep state.

9. The method of claim 8, further comprising transmitting, via communications circuitry, the set of electronic signature signals and associated data to an operations center.

10. The method of claim 8, wherein the scanning occurs continuously or intermittent.

11. The method of claim 8, wherein the one or more signal processors are in communication with a power source.

12. The method of claim 11, wherein the one or more signal processors and the plurality of signal receivers are housed within a portable deployable package, and wherein the power source comprises an internal power source within the portable deployable package and connected to the one or more signal processors and each of the signal receivers.

13. The method of claim 11, wherein the power source comprises one or more of an external power source, a battery, or a capacitor based power source.

14. The method of claim 8, wherein the one or more personal electronic devices comprise one or more of electrical on-board aircraft equipment, an aircraft beacon, or personal computing devices separate from the electrical on-board aircraft equipment and on-board the aircraft.

15. The method of claim 14, wherein the one or more personal computing devices comprise a cellular phone, a smartphone, a laptop computer, a desktop computer, an e-reader, a tablet computer, wearable Bluetooth devices, wearable smart devices; handheld electronic entertainment systems, or any other personal electronic devices.

16. The method of claim 8, wherein the one or more signal processors, the plurality of signal receivers, and communications circuitry are included in a concealable or covert surveillance system package; and further comprising deploying the package in proximity to an airport or landing field.

17. The method of claim 8, wherein each of the associated data records comprises one or more of a location, proximity to one or more of the signal receivers, a time and date an electronic signature signal is detected, manufacturer identification, device type, known associations, or other data elements.

18. The method of claim 8, wherein the signal receivers are configured to scan for electronic signature signals external to the aircraft.

19. The method of claim 8, wherein the electronic signature signals external to the aircraft include electronic signature signals from one or more of other transportation vehicles or electronic devices associated with the other transportation vehicles.

20. A signal collection and identification assembly deployable to an airfield or other location comprising:

a plurality of signal receivers configured to scan for a plurality of electronic signature signals from proximate aircraft;

wherein each of the signal receivers of the plurality of signal receivers is configured to scan for a selected type of electronic signature signal; and wherein the electronic signature signals comprise a range of signal frequencies, communications protocols, or combinations thereof, specific to electronics commonly associated with selected aircraft, vehicles, or personal electronics;

one or more signal processors in signal communication with the signal receivers; and wherein the one or more signal processors configured to execute instructions from memory to:

place the one or more signal processors in a sleep state prior to detection of the electronic signature signals while the signal receivers remain in a powered on state sufficient to continue to scan for the electronic signature signals;

monitor the signal receivers for one or more detected electronic signature signals indicative of one or more signal frequencies, communications protocols, or combinations thereof, associated with the selected aircraft, vehicles or personal electronics collected from the scans performed by the signal receivers;

place the one or more signal processors in a powered on state upon detection of one or more electronic signature signals;

classify the detected electronic signature signals to determine a likelihood of a presence of an identifiable aircraft, vehicle, person or personal electronic device within a range of operation of the signal collection and identification assembly; and store the detected electronic signature signals in memory with an associated location.

21. The signal collection and identification assembly of claim 20, wherein the signal collection and identification assembly comprises a portable and deployable package.

22. The signal collection and identification assembly of claim 21, wherein the portable and deployable package includes a camouflaged covering based on a surrounding environment.

23. The signal collection and identification assembly of claim 22, wherein the camouflaged covering is configured to resemble one or more of a natural element, trash, or a common item.

24. The signal collection and identification assembly of claim 20, further comprising a communications circuitry configure to transmit the detected electronic signature signals to an operations center.

25. The signal collection and identification assembly of claim 21, further comprising a power source.

26. The signal collection and identification assembly of claim 25, wherein the power source comprises at least two replaceable batteries or energy storage devices.

27. The signal collection and identification assembly of claim 26, wherein one of the two replaceable batteries or energy storage devices received within the portable and deployable package.

28. The system of claim 5, wherein the one or more signal processors are configured to execute instructions from memory to place the one or more signal processors in the sleep state after a period of time sufficient to execute the instructions.

* * * * *